(12) United States Patent
Tsutsumi

(10) Patent No.: US 9,966,189 B2
(45) Date of Patent: May 8, 2018

(54) MONOLITHIC CERAMIC ELECTRONIC COMPONENT

(71) Applicant: Murata Manufacturing Co., Ltd., Nagaokakyo-shi, Kyoto-fu (JP)

(72) Inventor: Hironori Tsutsumi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 299 days.

(21) Appl. No.: 14/640,299

(22) Filed: Mar. 6, 2015

(65) Prior Publication Data

US 2015/0179341 A1 Jun. 25, 2015

Related U.S. Application Data

(63) Continuation of application No. 14/494,849, filed on Sep. 24, 2014, now Pat. No. 8,995,109.

(30) Foreign Application Priority Data

Oct. 30, 2013 (JP) .................................. 2013-225321
Jul. 18, 2014 (JP) .................................. 2014-147384

(51) Int. Cl.
*H01G 4/12* (2006.01)
*H01G 4/30* (2006.01)
(Continued)

(52) U.S. Cl.
CPC ........... *H01G 4/1209* (2013.01); *B32B 37/10* (2013.01); *B32B 37/24* (2013.01); *H01G 4/012* (2013.01);
(Continued)

(58) Field of Classification Search
CPC ......... H01G 4/12; H01G 4/30; B32B 2457/16
See application file for complete search history.

(56) References Cited

U.S. PATENT DOCUMENTS

2004/0046285 A1* 3/2004 Tanii ..................... H01G 4/30
264/320
2004/0233612 A1* 11/2004 Sugimoto ............... H01G 4/30
361/312

(Continued)

FOREIGN PATENT DOCUMENTS

JP 6-215978 A 8/1994
JP 2003-133161 A 5/2003

(Continued)

OTHER PUBLICATIONS

Tsutumi, "Monolithic Ceramic Electronic Component", U.S. Appl. No. 14/494,849, filed Sep. 24, 2014.
Official Communication issued in corresponding Korean Patent Application No. 10-2014-0132381, dated Dec. 28, 2015.

*Primary Examiner* — Carson Gross
(74) *Attorney, Agent, or Firm* — Keating & Bennett, LLP

(57) ABSTRACT

A method for manufacturing a monolithic ceramic electronic component includes the steps of preparing a first ceramic outer layer, stacking a plurality of inner electrodes and a plurality of ceramic green sheets on the first ceramic outer layer, forming an inner portion, applying first pressing in the stacking direction, forming an outer portion on the inner portion to form a second ceramic outer layer, applying second pressing in the stacking direction to form a multi-layer body, cutting the mother multilayer body to obtain individual multilayer bodies, sintering the individual multilayer bodies to obtain ceramic bodies, and forming first and second outer electrodes on the outer surface of each of ceramic bodies.

17 Claims, 5 Drawing Sheets

(51) Int. Cl.
*H01G 4/012* (2006.01)
*H01G 4/232* (2006.01)
*B32B 37/10* (2006.01)
*B32B 37/24* (2006.01)
*H01G 4/248* (2006.01)

(52) U.S. Cl.
CPC ............ *H01G 4/12* (2013.01); *H01G 4/1227* (2013.01); *H01G 4/232* (2013.01); *H01G 4/248* (2013.01); *H01G 4/30* (2013.01); *B32B 2037/243* (2013.01); *B32B 2457/00* (2013.01); *B32B 2457/16* (2013.01); *Y10T 156/10* (2015.01)

(56) References Cited

U.S. PATENT DOCUMENTS

| | | | | |
|---|---|---|---|---|
| 2005/0180092 | A1* | 8/2005 | Hibi | H01G 4/30 361/311 |
| 2012/0306325 | A1* | 12/2012 | Kim | H01G 4/30 310/366 |
| 2014/0022690 | A1* | 1/2014 | Kim | H01G 4/30 361/301.4 |

FOREIGN PATENT DOCUMENTS

| | | | |
|---|---|---|---|
| JP | 2003133161 A | * | 5/2003 |
| JP | 2005-340663 A | | 12/2005 |

* cited by examiner

MONOLITHIC CERAMIC ELECTRONIC COMPONENT

BACKGROUND OF THE INVENTION

1. Field of the Invention

The present invention relates to a method for manufacturing a monolithic ceramic electronic component including a ceramic body in which a plurality of ceramic layers are stacked and a plurality of outer electrodes disposed on an outer surface of the ceramic body and a monolithic ceramic electronic component.

2. Description of the Related Art

In recent years, miniaturization and increases in electrostatic capacities of monolithic ceramic electronic components, e.g., monolithic ceramic capacitors, have been required. Consequently, the number of stacking of inner electrodes has increased. As the number of stacking of the inner electrodes increases, the inner electrodes are tightly packed in an opposite region serving as a portion in which inner electrodes connected to different potentials are opposite to each other in the stacking direction. That is, the density of inner electrodes increases in the opposite region.

On the other hand, in an extension region serving as a portion in which the inner electrodes are not opposite to each other, the extended inner electrodes are connected to the same potential among the inner electrodes connected to the different potentials. Consequently, the density of the inner electrodes does not increase to the extent of that in the opposite region. Therefore, as the number of stacking of the inner electrodes increases, a difference in the density of the inner electrodes between the opposite region and the extension region becomes large.

If a difference in the density of the inner electrodes between the opposite region and the extension region becomes large, the pressing pressure is not easily applied to the extension region in which the density of the inner electrodes is small, and delamination occurs easily between the inner electrodes and the ceramic layers.

As for a measure against the delamination, for example, Japanese Unexamined Patent Application Publication No. 2-161713 discloses a method in which an upper surface and a lower surface of a ceramic multilayer material are covered with rubber, and isostatic pressing is applied.

According to the isostatic pressing described in Japanese Unexamined Patent Application Publication No. 2-161713, the delamination does not occur easily, although the corner portions 101a of the resulting ceramic multilayer body 101 may be rounded, as shown in FIG. 5. The corner portions 101a are disposed in an extension region where the density of inner electrodes is small and, therefore, compression in the stacking direction occurs easily by pressing as compared with that in an opposite region. The ceramic multilayer body having round corner portions stands up in the mounting easily, so that a so called tombstone phenomenon may occur.

SUMMARY OF THE INVENTION

Preferred embodiments of the present invention provide a method for manufacturing a monolithic ceramic electronic component, wherein delamination between inner electrodes and ceramic layers does not occur easily and excellent mounting stability is achieved.

A method for manufacturing a monolithic ceramic electronic component including a ceramic body, in which a plurality of ceramic layers are stacked and which includes first and second principal surfaces and first and second end surfaces, and first and second outer electrodes disposed on the first and second end surfaces, respectively, of the ceramic body, according to a preferred embodiment of the present invention includes the steps of forming a first mother ceramic outer layer, stacking a plurality of inner electrodes and a plurality of mother ceramic green sheets on the first mother ceramic outer layer to form a mother inner layer block, forming a mother ceramic inner portion on the mother inner layer block, performing a first pressing by pressing the mother inner layer block from above the mother ceramic inner portion in the stacking direction, forming a mother ceramic outer portion on the mother ceramic inner portion to form a second mother ceramic outer layer defined by the mother ceramic inner portion and the mother ceramic outer portion, and performing a second pressing by pressing the second mother ceramic outer layer in the stacking direction to form a mother multilayer body.

In the method for manufacturing a monolithic ceramic electronic component according to the above-described preferred embodiment, the step of performing a first pressing is performed by placing an elastic sheet on the mother ceramic inner portion and pressing the mother ceramic inner portion from above the elastic sheet in the stacking direction.

In the method for manufacturing a monolithic ceramic electronic component according to the above-described preferred embodiment, the elastic sheet is a rubber sheet.

In the method for manufacturing a monolithic ceramic electronic component according to the above-described preferred embodiment, the step of performing a second pressing is performed by pressing the second mother ceramic outer layer from above a rigid body in the stacking direction.

In the method for manufacturing a monolithic ceramic electronic component according to the above-described preferred embodiment, an elasticity of a pressing member placed on the mother ceramic inner portion in the step of performing a first pressing is lower than an elasticity of a pressing member placed on the second mother ceramic outer layer in the step of performing a second pressing.

In the method for manufacturing a monolithic ceramic electronic component according to the above-described preferred embodiment, the step of forming a mother ceramic outer portion includes placing a mother ceramic green sheet on the mother ceramic inner portion.

In the method for manufacturing a monolithic ceramic electronic component according to the above-described preferred embodiment, the step of forming a mother ceramic outer portion is performed by applying a slurry on the mother ceramic inner portion.

In the method for manufacturing a monolithic ceramic electronic component according to the above-described preferred embodiment, the second mother ceramic outer layer is thicker than the first mother ceramic outer layer.

In the method for manufacturing a monolithic ceramic electronic component according to the above-described preferred embodiment, the mother ceramic inner portion is thicker than the first mother ceramic outer layer.

In the method for manufacturing a monolithic ceramic electronic component according to the above-described preferred embodiment, a Si content of the mother ceramic outer portion is larger than a Si content of the mother ceramic inner portion.

The method for manufacturing a monolithic ceramic electronic component according to the above-described preferred embodiment further includes a step of forming a boundary layer between the mother ceramic inner portion and the mother ceramic outer portion, wherein Si is concentrated in the boundary layer.

In the method for manufacturing a monolithic ceramic electronic component according to the above-described preferred embodiment, a Mn content of the mother ceramic outer portion is smaller than Mn contents of the first mother ceramic outer layer and the mother ceramic inner portion.

A method for manufacturing a monolithic ceramic electronic component including a ceramic body, in which a plurality of ceramic layers are stacked and which includes first and second principal surfaces and first and second end surfaces, and first and second outer electrodes disposed on the outer surface of the ceramic body and disposed on the first and second end surfaces, respectively, of the ceramic body, according to another preferred embodiment of the present invention includes the steps of forming a first mother ceramic outer layer, stacking a plurality of inner electrodes and a plurality of mother ceramic green sheets on the first mother ceramic outer layer to form a mother inner layer block, forming a mother ceramic inner portion on the mother inner layer block, pressing the mother inner layer block from above the mother ceramic inner portion in the stacking direction, and forming a mother ceramic outer portion on the mother ceramic inner portion by applying a slurry to form a second mother ceramic outer layer defined by the mother ceramic inner portion and the mother ceramic outer portion.

In the method for manufacturing a monolithic ceramic electronic component according to the above-described preferred embodiment, the step of pressing is performed by placing an elastic sheet on the mother ceramic inner portion and pressing the mother ceramic inner portion from above the elastic sheet in the stacking direction.

In the method for manufacturing a monolithic ceramic electronic component according to the above-described preferred embodiment, the elastic sheet is a rubber sheet.

In the method for manufacturing a monolithic ceramic electronic component according to the above-described preferred embodiment, the mother ceramic inner portion is thicker than the first mother ceramic outer layer.

In the method for manufacturing a monolithic ceramic electronic component according to the above-described preferred embodiment, a Si content of the mother ceramic outer portion is larger than a Si content of the mother ceramic inner portion.

The method for manufacturing a monolithic ceramic electronic component according to the above-described preferred embodiment further includes a step of forming a boundary layer between the mother ceramic inner portion and the mother ceramic outer portion, wherein Si is concentrated in the boundary layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will be clarified below by describing specific preferred embodiments according to the present invention with reference to the drawings. In the present specification, initially, a monolithic ceramic electronic component according to various preferred embodiments of the present invention will be described in detail and, then, a method for manufacturing a monolithic ceramic electronic component, according to various preferred embodiments of the present invention, will be described.

Figure 1A:
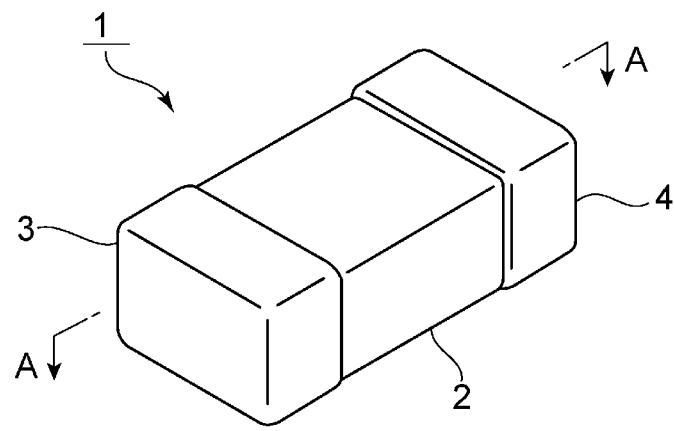
FIG. 1A is a perspective view of a monolithic ceramic capacitor according to a preferred embodiment of the present invention and FIG. 1B is a sectional view along a line A-A shown in FIG. 1A.
Figure 1B:
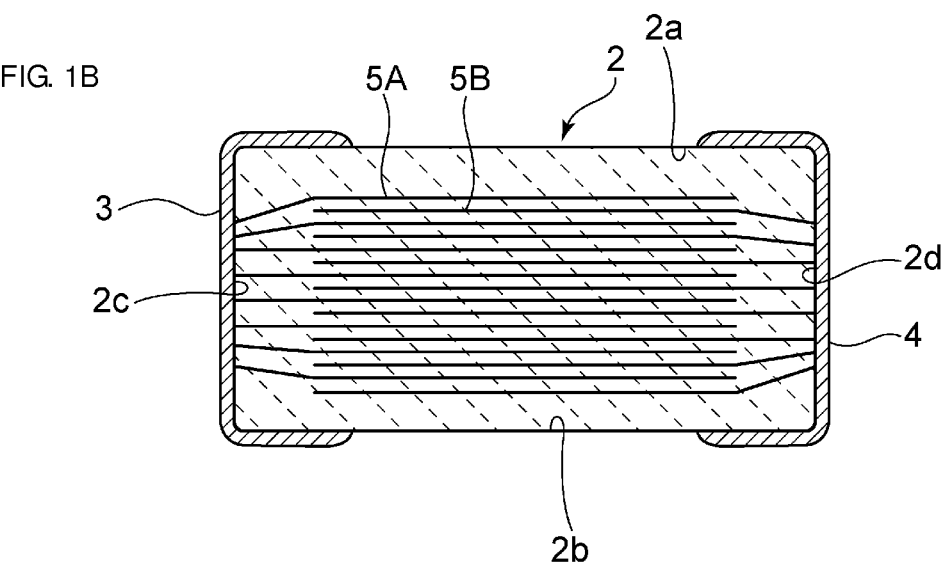

FIG. 1A is a perspective view of a monolithic ceramic capacitor according to a preferred embodiment of the present invention. FIG. 1B is a sectional view along a line A-A shown in FIG. 1A.

A monolithic ceramic capacitor 1 includes a ceramic body 2 in which a plurality of ceramic layers are stacked, a first outer electrode 3, a second outer electrode 4, first inner electrodes 5A, and second inner electrodes 5B. The ceramic body 2 preferably is in the shape of a rectangular or substantially parallelepiped including a first principal surface 2a, a second principal surface 2b, a first end surface 2c, and a second end surface 2d. An appropriate material is used for the ceramic body 2 and, in the present preferred embodiment, a dielectric ceramic containing $BaTiO_3$ or CaZr as a primary component is used.

The first outer electrode 3 and second outer electrode 4 are disposed on the outer surface of the ceramic body 2 and are disposed on the first end surface 2c and the second end surface 2d, respectively, of the ceramic body 2. A metal, e.g., Cu, Ni, Ag, Au, or Pd, is used for the first outer electrode 3 and the second outer electrode 4, although not specifically limited.

The ceramic body 2 includes an inner layer block 17 in which the plurality of inner electrodes 5A and the plurality of inner electrodes 5B are disposed, a first ceramic outer layer 7 disposed on one side in the stacking direction of the inner layer block 17, and a second ceramic outer layer 16 disposed on the other side in the stacking direction of the inner layer block 17. In the present specification, the inner layer block 17 refers to a portion of the ceramic body 2 disposed between the inner electrode nearest to the first principal surface 2a of the ceramic body 2 among the plurality of first inner electrodes 5A and second inner electrodes 5B, and the inner electrode nearest to the second principal surface 2b of the ceramic body 2.

Preferably, the second ceramic outer layer 16 is thicker than the first ceramic outer layer 7. This is because in the case where production is performed by the manufacturing method described below, the second ceramic outer layer 16 flows more easily in the second pressing step.

The second ceramic outer layer 16 preferably has an inorganic material composition different from the composition of the first ceramic outer layer 7, although it is not specifically limited. As for the inorganic material, for example, barium titanate, Dy, Mn, Mg, and Si may be used. Preferably, the first ceramic outer layer 7 contains barium titanate, Mn, and Si. Preferably, the second ceramic outer layer 16 contains barium titanate and Si. More preferably, the Si content of the second ceramic outer layer 16 is larger than the Si content of the first ceramic outer layer 7. Alternatively, it is preferable that the Mn content of the second ceramic outer layer 16 be smaller than the Mn content of the first ceramic outer layer 7.

In the case where the Si content of the second ceramic outer layer 16 is larger than the Si content of the first ceramic outer layer 7, the strength of the outer layer is still more enhanced.

In the case where the Mn content of the second ceramic outer layer 16 is smaller than the Mn content of the first ceramic outer layer 7, the color of the second ceramic outer layer 16 becomes close to white as compared with the color of the first ceramic outer layer 7, and the surface and the back of the multilayer body can be distinguished by the hue. If the Mn content of the second ceramic outer layer 16 decreases, the strength of the outer layer may be reduced. In order to prevent this, it is more preferable to combine with an increase in the Si content.

In the case where the second ceramic outer layer 16 has the inorganic material composition different from the composition of the first ceramic outer layer 7, it is preferable that the second ceramic outer layer 16 is thicker than the first ceramic outer layer 7 and a portion of the second ceramic outer layer 16 on the inner layer block 17 side have the same or substantially the same inorganic material composition as the composition of the first ceramic outer layer 7. This is for the purpose of preventing degradation in the characteristics of the capacitor due to diffusion of the inorganic material.

The plurality of first inner electrodes 5A and second inner electrodes 5B are extended to the first end surface 2c or the second end surface 2d of the ceramic body 2. The plurality of first inner electrodes 5A and second inner electrodes 5B include portions opposite to each other with ceramic layers therebetween in the stacking direction of the ceramic body 2. In the present specification, a portion in which the plurality of first inner electrodes 5A and second inner electrodes 5B are opposite to each other with the ceramic layers therebetween is specified to be an opposite region and a portion in which the plurality of first inner electrodes 5A and second inner electrodes 5B are not opposite to each other with ceramic layers therebetween are specified to be an extension region.

The material constituting the plurality of first inner electrodes 5A and second inner electrodes 5B is not specifically limited, although a metal containing a base metal, e.g., Ni or Cu, as a primary component is preferable.

In the present preferred embodiment, in the extension regions, the plurality of first inner electrodes 5A and second inner electrodes 5B come close to the center of the first end surface 2c and the center of the second end surface 2d, respectively, of the ceramic body 2 in the thickness direction as the plurality of first inner electrodes 5A and second inner electrodes 5B approach the first end surface 2c and the second end surface 2d, respectively. Therefore, in the present preferred embodiment, the inner electrodes are also dense in the extension regions, so that an occurrence of delamination between the inner electrodes and the ceramic layers is prevented in the extension regions.

In the present preferred embodiment, in the extension regions, the distances from the first principal surface 2a and the second principal surface 2b of the ceramic body 2 to the inner electrodes nearest to the first principal surface 2a and the second principal surface 2b, respectively, of the ceramic body 2 among the plurality of first inner electrodes 5A and second inner electrodes 5B increase as the first end surface 2c and the second end surface 2d, respectively, of the ceramic body 2 are approached.

Figure 5:
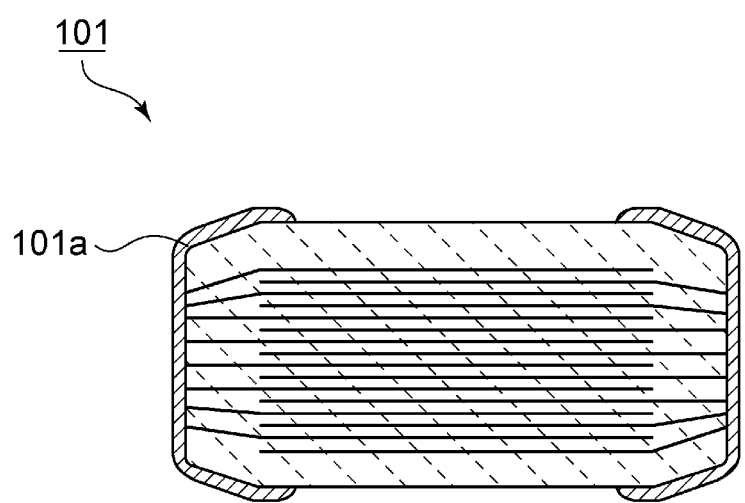
FIG. 5 is a schematic sectional view of a ceramic multilayer body in the related art.

That is, the roundness of the corner portions of the monolithic ceramic capacitor according to the present preferred embodiment is small as compared with that of the ceramic multilayer body 101 in the related art shown in FIG. 5. In this regard, the corner portion refers to the portion where the first end surface 2c or the second end surface 2d is butted against the first principal surface 2a or the second principal surface 2b.

As described above, the roundness of the corner portions of the monolithic ceramic capacitor according to the present preferred embodiment is reduced, so that standing up in the mounting does not occur easily and an occurrence of a so-called tombstone phenomenon is prevented. That is, the monolithic ceramic capacitor according to the present preferred embodiment is a monolithic ceramic electronic component exhibiting excellent mounting stability. Preferably, a maximum distance from the second principal surface 2b of the ceramic body to the inner electrode nearest to the second principal surface 2b of the ceramic body is larger than a maximum distance from the first principal surface 2a of the ceramic body to the inner electrode nearest to the first principal surface 2a of the ceramic body. More specifically, a difference between a maximum distance and a minimum distance from the second principal surface 2b of the ceramic body to the inner electrode nearest to the second principal surface 2b of the ceramic body is larger than a difference between a maximum distance and a minimum distance from the first principal surface 2a of the ceramic body to the inner electrode nearest to the first principal surface 2a of the ceramic body.

In the case where a difference in the total thickness of all of the inner electrodes between the extension region and the opposite region is specified to be a height difference and the ratio of the height difference to the thickness of the inner layer block 17 is specified to be a height difference ratio, it is more preferable that the present invention be applied to a monolithic ceramic capacitor having a height difference of about 58.5 μm or more and a height difference ratio of about 0.21 or more, for example. This is because as for the monolithic ceramic capacitor, especially having a thickness of the ceramic body in the stacking direction is between about 0.3 mm and about 0.7 mm inclusive, having a height difference of about 58.5 μm or more and a height difference ratio of about 0.21 or more, the corner portions are rounded more easily and a so-called tombstone phenomenon occurs easily in mounting. This point will be described in more detail in the example described later.

A method for manufacturing a monolithic ceramic capacitor as a non-limiting example of the monolithic ceramic electronic component according to a preferred embodiment of the present invention will be described in detail with reference to FIGS. 2A to 2D and FIGS. 3A to 3C.

Figure 2A:
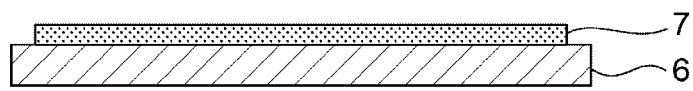
FIGS. 2A to 2D are sectional views illustrating a method for manufacturing a monolithic ceramic capacitor according to a preferred embodiment of the present invention.

As shown in FIG. 2A, a first ceramic outer layer 7 is formed on a stacking board 6. The first ceramic outer layer 7 may be formed by placing a ceramic green sheet or be formed by printing or applying a ceramic slurry. The ceramic slurry is a liquid containing ceramic particles and may be called a ceramic paste or the like.

Figure 2B:
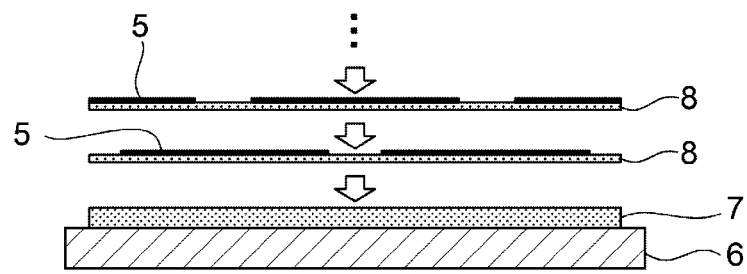

As shown in FIG. 2B, a plurality of inner electrodes 5 and a plurality of ceramic green sheets 8 are stacked sequentially on the first ceramic outer layer 7. In FIG. 2B, the plurality of inner electrodes 5 and the plurality of ceramic green sheets 8 are stacked alternately, although it is not always necessary to stack alternately.

Figure 2C:
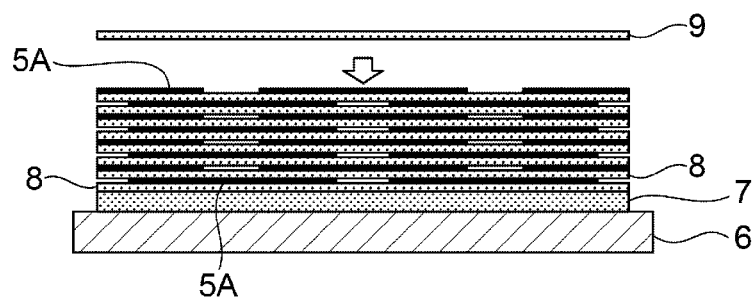

As shown in FIG. 2C, an inner portion 9 of the second ceramic outer layer 16 is formed on the plurality of ceramic green sheets 8. Consequently, the inner electrode 5 exposed as the outermost surface is protected from contact with the outside. The inner portion 9 may be formed by placing a ceramic green sheet, as in the present preferred embodiment, or be formed by printing or applying a ceramic slurry. The inner portion 9 may include an inner conductor layer which does not contribute to the electrostatic capacity of the resulting capacitor substantially. For example, the inner conductor layer may be overlaid on the same position as the inner electrode 5.

In the case where the first ceramic outer layer 7 is thick, the first ceramic outer layer 7 may be deformed while the plurality of ceramic green sheets 8 are stacked sequentially, and positional shift of the stacked ceramic green sheets 8 may occur. Therefore, it is preferable that the first ceramic outer layer 7 be thinner. Alternatively, the inner portion 9 may be made thick rather than making the first ceramic outer layer 7 thin. That is, the inner portion 9 may have a thickness larger than the thickness of the first ceramic outer layer 7. Consequently, a positional shift of the stacked ceramic green sheets 8 is prevented.

Preferably, the plurality of ceramic green sheets 8 and the inner portion 9 have the same inorganic material composition. This is because if the inorganic material compositions are different, the compositions are changed by diffusion of the inorganic material during firing and the characteristics of the resulting capacitor may be influenced. However, the plurality of ceramic green sheets 8 and the inner portion 9 may have different inorganic material compositions. Regarding inorganic material compositions, the plurality of ceramic green sheets 8 and the inner portion 9 may have the same compositions.

Figure 2D:
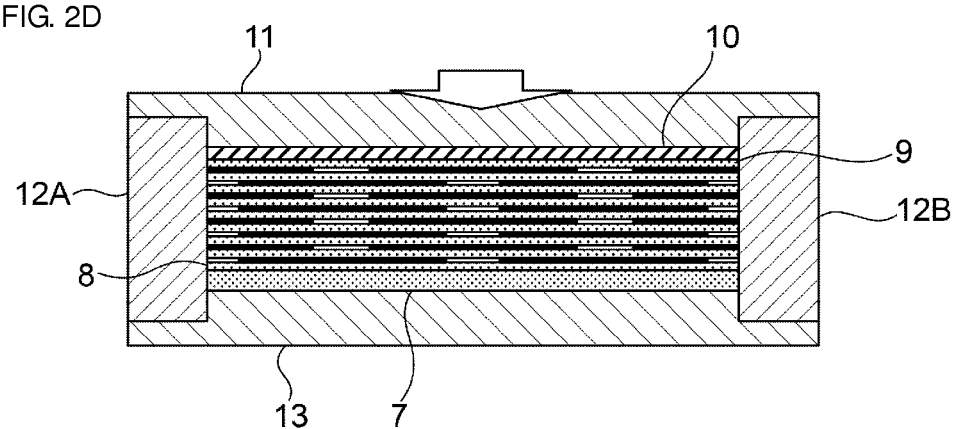

As shown in FIG. 2D, an elastic sheet 10 is placed on the inner portion 9 and first pressing is applied from above the elastic sheet 10 in the stacking direction. Put another way, the first pressing is applied from the outer surface of the first ceramic outer layer 7 in the stacking direction. A sufficient pressure is applied to the extension region as well by applying the first pressing and, thus, the adhesion between the ceramic sheet layers and the inner electrode layers in the extension region is enhanced.

In the present preferred embodiment, the first pressing may be performed by applying a pressure with a rigid plate 11. Alternatively, as shown in FIG. 2D, the first pressing may be performed by placing a multilayer body formed from the first ceramic outer layer 7, the plurality of ceramic green sheets 8, and the inner portion 9 on a rigid plate 13 and fitting the multilayer body into frames 12A and 12B surrounding the multilayer body. The rigid plate 11 preferably has a modulus of elasticity higher than the modulus of elasticity of the elastic sheet 10 and is formed from a metal, ceramics, or the like.

The elastic sheet is preferably a soft material, for example, a material having rubber elasticity, and is more preferably a rubber sheet. In the case where the rubber sheet is used, still more pressure is applied to the extension region, so that the adhesion between the ceramic sheets and the inner electrodes in the extension region is enhanced still more effectively. The elastic sheet may be a resin sheet other than the rubber sheet.

Also, a pressure is applied to the first ceramic outer layer 7 from the outer surface in the stacking direction and, thus, still more pressure is applied to the extension region, so that the adhesion between the ceramic sheets and the inner electrodes in the extension region is enhanced still more effectively.

The first pressing is a step different from contact bonding applied when the ceramic green sheets are stacked sequentially. That is, in the first pressing, the multilayer body is transferred from the stacking board 6 to the rigid plate 13 and the first pressing is performed.

Figure 3A:
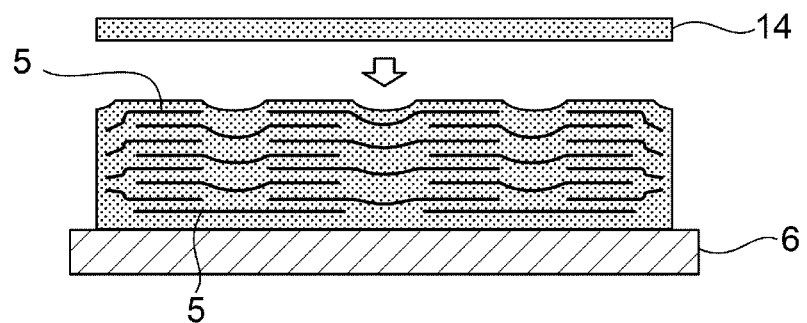
FIGS. 3A to 3C are sectional views illustrating a method for manufacturing a monolithic ceramic capacitor according to a preferred embodiment of the present invention.

As shown in FIG. 3A, an outer portion 14 of the second ceramic outer layer 16 is formed on the multilayer body obtained by the first pressing to form a second ceramic outer layer 16. Preferably, the second ceramic outer layer 16 is thicker than the first ceramic outer layer 7 because, in this case, the second ceramic outer layer 16 flows to the extension region easily. The outer portion 14 may be formed by placing a ceramic green sheet or be formed by printing or applying a ceramic slurry. Specifically, formation may be made through application of a slurry by screen printing, spray coating, die coating, or the like. It is desirable that a resin component be contained in the slurry. As for a solvent, an organic solvent, water, or the like is preferable.

It is preferable that the outer portion 14, the plurality of ceramic green sheets 8, and the inner portion 9 have the same inorganic material composition. This is because if the inorganic material compositions are different, the compositions are changed by diffusion of the inorganic material during firing and the characteristics of the resulting capacitor may be influenced. However, the inorganic material compositions may be different.

The first ceramic outer layer 7 and the outer portion of the second ceramic outer layer 16 may have different inorganic material compositions. As for the inorganic material, for example, barium titanate, Dy, Mn, Mg, and Si may be used. Preferably, the first ceramic outer layer 7 contains barium titanate, Mn, and Si. Preferably, the outer portion 14 contains barium titanate and Si. More preferably, the Si content of the outer portion 14 is larger than the Si content of the first ceramic outer layer 7. Alternatively, the Mn content of the outer portion 14 may be smaller than the Mn content of the first ceramic outer layer 7.

The inner portion 9 of the second ceramic outer layer may have the same inorganic material composition as the composition of the first ceramic outer layer 7. That is, as with the first ceramic outer layer 7, the inner portion 9 and the outer portion 14 may have different inorganic material compositions. As for the inorganic material, for example, barium titanate, Dy, Mn, Mg, and Si may be used. Preferably, the inner portion 9 contains barium titanate, Mn, and Si. Preferably, the outer portion 14 contains barium titanate and Si. More preferably, the Si content of the outer portion 14 is larger than the Si content of the inner portion 9. Alternatively, the Mn content of the outer portion 14 may be smaller than the Mn content of the inner portion 9.

In the case where the Mn content of the outer portion is smaller than the Mn content of the first ceramic outer layer 7, the color of the outer portion 14 becomes close to white as compared with the color of the first ceramic outer layer 7, and the surface and the back of the multilayer body are easily distinguished by the hue. If the Mn content of the outer portion 14 decreases, the strength of the outer layer may be reduced. In order to prevent this, it is more preferable to combine with an increase in the Si content.

Figure 4:
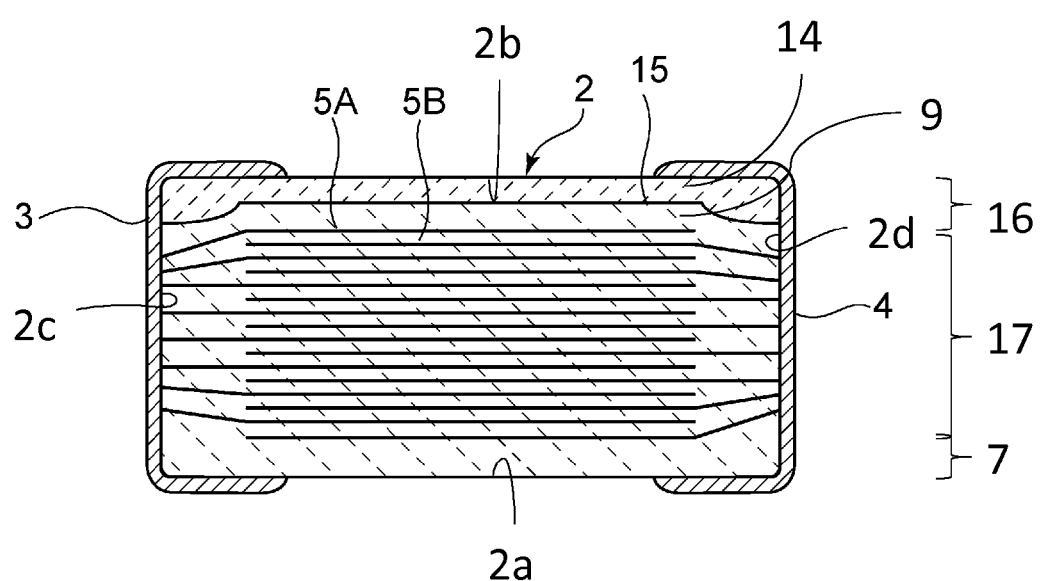
FIG. 4 is a sectional view illustrating a boundary layer of a monolithic ceramic capacitor obtained by the method for manufacturing a monolithic ceramic capacitor according to a preferred embodiment of the present invention.

In the case where the Si content of the outer portion 14 is larger than the Si content of the first ceramic outer layer 7, the strength of the outer layer is still more enhanced. Furthermore, in firing described later, Si gathers between the outer portion 14 and inner portion 9 and a boundary portion 15 shown in FIG. 4 is formed. In the case where the boundary portion 15 is formed, the adhesion between the outer portion 14 and the inner portion 9 is enhanced, so that peeling is prevented.

In the case where the outer portion 14 and the inner portion 9 are allowed to have different inorganic material compositions, in order to prevent the characteristics of the resulting capacitor from being influenced, it is preferable that the thickness of the inner portion 9 be increased. That is, preferably, the thickness of the inner portion 9 is larger than the thickness of the first ceramic outer layer 7.

Preferably, the plurality of ceramic green sheets 8 and the inner portion 9 have an organic material composition different from the composition of the outer portion 14. More preferably, as for the outer portion 14, the viscosity of the organic material is reduced or the content of the organic material is increased as compared with those in the ceramic green sheets 8 and the inner portion 9. Consequently, the fluidity of the organic material in the outer portion 14 is still more enhanced in the second pressing described later.

In the present preferred embodiment, a ceramic layer may be further provided in the extension region before or after the outer portion 14 is placed. In this case, denting of the principal surface of the resulting multilayer body, described later, is still more significantly reduced or prevented.

Figure 3B:
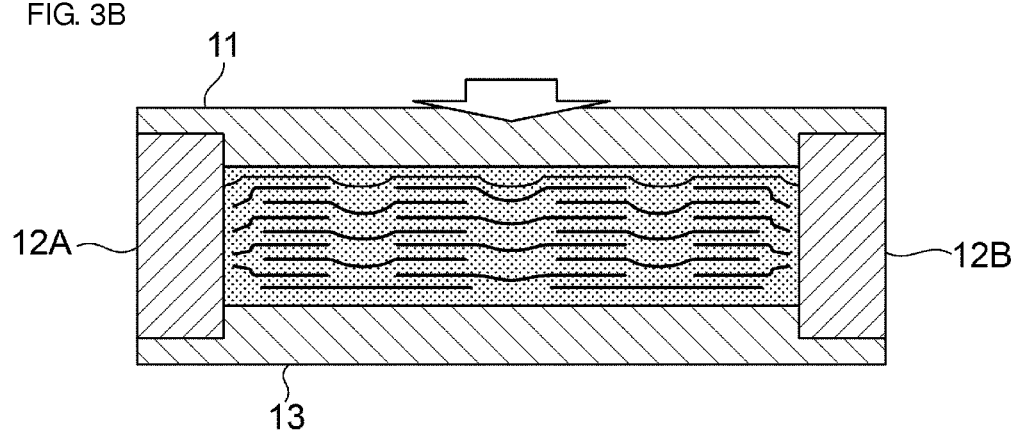

As shown in FIG. 3B, second pressing, in which the rigid plate 11 is placed on the outer portion 14 and pressing is performed with the rigid plate in the stacking direction, is applied to form a mother multilayer body. Here, the modulus of elasticity of a press member, which is the rigid plate 11, used in the second pressing is higher than the modulus of elasticity of a press member, which is the elastic sheet, used in the first pressing. The rigid plate 11 is formed from a metal, ceramics, or the like. Consequently, the outer portion 14 is allowed to flow to the extension region and the height difference, which is generated in the first pressing, between the extension region and the opposite region is filled. That is, denting of the principal surface of the resulting mother multilayer body is prevented.

In the present preferred embodiment, the second pressing step may be omitted. In this case, it is necessary that the outer portion 14 be formed by application of the slurry. This is because the slurry is a liquid, so that the outer portion 14 is allowed to flow to the extension region without applying the second pressing. In addition, in the case where the slurry is applied, the contact area between the outer portion 14 and the inner portion 9 increases and, thus, the adhesion between the outer portion 14 and the inner portion 9 is enhanced. Therefore, in this case, the adhesion between the outer portion 14 and the inner portion 9 is enhanced and denting of the principal surface of the resulting mother multilayer body is prevented without performing the second pressing.

The outer portion 14 may be placed on not only the inner portion 9 but also the first ceramic outer layer 7 before the second pressing step. In this case, a height difference generated on the principal surface on the first ceramic outer layer side of the mother multilayer body is also filled.

Figure 3C:
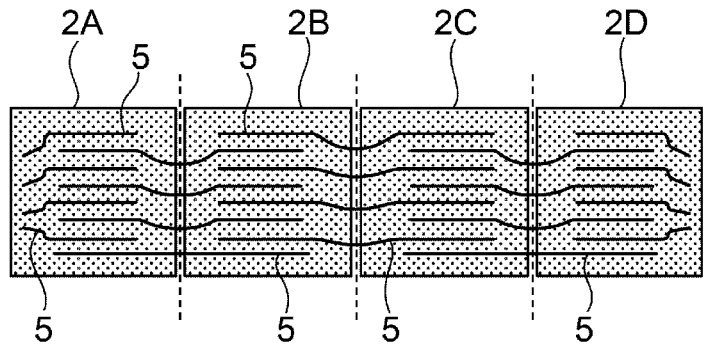

The mother multilayer body is cut along dotted lines shown in FIG. 3C to obtain individual multilayer bodies 2A, 2B, 2C, and 2D. Examples of methods of the cutting include force-cutting, cutting (dicing), and laser cutting.

The individual multilayer bodies 2A, 2B, 2C, and 2D are fired. As for the firing condition, the firing preferably is performed by raising the temperature to about 1,100° C. to about 1,300° C., for example. Finally, outer electrodes are formed on the outer surfaces of the individual multilayer bodies 2A, 2B, 2C, and 2D by applying a paste or plating, so that monolithic ceramic capacitors are obtained.

As described above, in the manufacturing method according to various preferred embodiments of the present invention, the multilayer body is pressed through the elastic sheet before the outer portion 14 is formed. Therefore, adhesion between the ceramic layers and the inner electrodes in the extension region is enhanced and an occurrence of delamination between the ceramic layers and the inner electrodes is significantly reduced or prevented.

Furthermore, in the manufacturing method according to various preferred embodiments of the present invention, the outer portion 14 is allowed to flow to the extension region and, thus, the mother multilayer body is formed, so that denting of the principal surface of the mother multilayer body is prevented. That is, in the monolithic ceramic capacitor obtained by the manufacturing method according to the preferred embodiments of the present invention, corner portions are not rounded in contrast to the ceramic multilayer body 101 shown in FIG. 5. Therefore, standing up in the mounting does not occur easily and an occurrence of a so-called tombstone phenomenon is significantly reduced or prevented. That is, the monolithic ceramic capacitor obtained by the manufacturing method according to various preferred embodiments of the present invention is a monolithic ceramic electronic component exhibiting excellent mounting stability.

Next, a specific experimental example will be described.

In the experimental example, a monolithic ceramic capacitor was produced by the manufacturing method according to a preferred embodiment of the present invention, where the predetermined thickness per ceramic layer after sintering was about 0.6 μm, the predetermined thickness of the inner electrode after sintering was about 0.45 μm, and the number of inner electrodes was 260.

For the purpose of comparison, a monolithic ceramic capacitor was produced by the method (a rubber sheet was placed on the mother multilayer body and pressing was performed once) according to the related art.

The outside dimensions of the two capacitors were 0.6 mm×0.3 mm×0.3 mm. The difference in density was 0.45 μm×130=58.5 μm in terms of height difference. The height difference ratio determined by dividing the height difference by the thickness of the inner layer block 17 was 58.5/{(0.6+0.45)×260}=0.21.

In this regard, the height difference ratio may be determined by dividing the difference between the distance of the inner electrodes located at two ends in the stacking direction passing through the center of the opposite region from each other and the distance of the inner electrodes located at two ends in the stacking direction passing through the center of the extension region from each other by the thickness of the multilayer body.

Twenty cross-sections each of the monolithic ceramic capacitors produced in the experimental example and by the method in the related art, where the cross-sections were taken along the direction perpendicular or substantially perpendicular to the inner electrodes and the direction bonding the first and second inner electrodes to the first and second end surfaces were observed. As a result, in all cross-sections, delamination was not observed and, in the extension regions, the distances from the first principal surface and the second principal surface of the ceramic body to the inner electrodes nearest to the first principal surface and the second principal surface, respectively, of the ceramic body among the plurality of first inner electrodes and second inner electrodes in the monolithic ceramic capacitor produced in the experimental example became larger than those in the monolithic ceramic capacitor produced by the related art as the first end surfaces and the second end surfaces, respectively, of the ceramic bodies were approached.

A method for measuring the thickness and the distance, e.g., the thickness of the outer layer, will be described below. The monolithic ceramic capacitor was embedded in a resin. The monolithic ceramic capacitor embedded in the resin is polished and, thus, an LT cross-section which passed through the center of the multilayer body and which is parallel or substantially parallel to the side surface of the multilayer body is exposed. The thickness and the distance are measured by observing the exposed LT cross-section with a scanning electron microscope (SEM). In this regard, the measurement accuracy of distance is improved by subjecting the exposed LT cross-section to ion milling to remove roll over due to polishing when the height difference is calculated, an average thickness of an inner electrode is used instead of a thickness of each inner electrode. The average thickness of an inner electrode is calculated by measuring three points of inner electrodes.

The analysis of the local composition of the monolithic ceramic capacitor is performed as described below.

As with the thickness measurement, the LT cross-section of the monolithic ceramic capacitor embedded in the resin is exposed, and the LT cross-section is observed with a wavelength dispersive X-ray analyzer (WDX) attached to a scanning electron microscope (SEM) and, thus, the composition analysis is performed. The distribution state of elements is examined on the basis of an image of the resulting element mapping.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a monolithic ceramic electronic component including a ceramic body, in which a plurality of ceramic layers are stacked and which includes first and second principal surfaces and first and second end surfaces, and first and second outer electrodes disposed on the first and second end surfaces, respectively, of the ceramic body, the method comprising the steps of:
   forming a first mother ceramic outer layer;
   stacking a plurality of inner electrodes and a plurality of mother ceramic green sheets on the first mother ceramic outer layer to form a mother inner layer block;
   forming a mother ceramic inner portion on the mother inner layer block;
   performing a first pressing by placing the mother inner layer block and the mother ceramic inner portion formed thereon directly on a rigid plate, placing an elastic sheet on the mother ceramic inner portion, and pressing the mother inner layer block from above the mother ceramic inner portion in the stacking direction;
   forming a mother ceramic outer portion on the mother ceramic inner portion to form a second mother ceramic outer layer defined by the mother ceramic inner portion and the mother ceramic outer portion; and
   performing a second pressing by placing a rigid body on the second mother ceramic outer layer and pressing the second mother ceramic outer layer from above the rigid body in the stacking direction to form a mother multilayer body; wherein
   the plurality of inner electrodes and the plurality of mother ceramic green sheets are stacked such that one of the plurality of mother ceramic green sheets is disposed on a surface of the first mother ceramic outer layer.

2. The method for manufacturing a monolithic ceramic electronic component according to claim 1, wherein the elastic sheet is a rubber sheet.

3. The method for manufacturing a monolithic ceramic electronic component according to claim 1, wherein an elasticity of a pressing member placed on the mother ceramic inner portion in the step of performing a first pressing is lower than an elasticity of a pressing member placed on the second mother ceramic outer layer in the step of performing a second pressing.

4. The method for manufacturing a monolithic ceramic electronic component according to claim 1, wherein the step of forming a mother ceramic outer portion includes placing a mother ceramic green sheet on the mother ceramic inner portion.

5. The method for manufacturing a monolithic ceramic electronic component according to claim 1, wherein the step of forming a mother ceramic outer portion is performed by applying a slurry on the mother ceramic inner portion.

6. The method for manufacturing a monolithic ceramic electronic component according to claim 1, wherein the second mother ceramic outer layer is thicker than the first mother ceramic outer layer.

7. The method for manufacturing a monolithic ceramic electronic component according to claim 6, wherein the mother ceramic inner portion is thicker than the first mother ceramic outer layer.

8. The method for manufacturing a monolithic ceramic electronic component according to claim 1, wherein a Si content of the mother ceramic outer portion is larger than a Si content of the mother ceramic inner portion.

9. The method for manufacturing a monolithic ceramic electronic component according to claim 8, further comprising a step of forming a boundary layer between the mother ceramic inner portion and the mother ceramic outer portion, wherein Si is concentrated in the boundary layer.

10. The method for manufacturing a monolithic ceramic electronic component according to claim 8, wherein a Mn content of the mother ceramic outer portion is smaller than Mn contents of the first mother ceramic outer layer and the mother ceramic inner portion.

11. The method for manufacturing a monolithic ceramic electronic component according to claim 10, wherein the second mother ceramic outer layer is thicker than the first mother ceramic outer layer.

12. The method for manufacturing a monolithic ceramic electronic component according to claim 11, wherein the mother ceramic inner portion is thicker than the first mother ceramic outer layer.

13. A method for manufacturing a monolithic ceramic electronic component including a ceramic body, in which a plurality of ceramic layers are stacked and which includes first and second principal surfaces and first and second end surfaces, and first and second outer electrodes disposed on the outer surface of the ceramic body and disposed on the first and second end surfaces, respectively, of the ceramic body, the method comprising the steps of:
   forming a first mother ceramic outer layer;
   stacking a plurality of inner electrodes and a plurality of mother ceramic green sheets on the first mother ceramic outer layer to form a mother inner layer block;
   forming a mother ceramic inner portion on the mother inner layer block;

placing the mother inner layer block and the mother ceramic inner portion formed thereon directly on a rigid plate;

placing an elastic sheet on the mother ceramic inner portion;

pressing the mother inner layer block from above the mother ceramic inner portion in the stacking direction; and forming a mother ceramic outer portion on the mother ceramic inner portion by applying a slurry to form a second mother ceramic outer layer defined by the mother ceramic inner portion and the mother ceramic outer portion; wherein the plurality of inner electrodes and the plurality of mother ceramic green sheets are stacked such that one of the plurality of mother ceramic green sheets is disposed on a surface of the first mother ceramic outer layer.

14. The method for manufacturing a monolithic ceramic electronic component according to claim 13, wherein the elastic sheet is a rubber sheet.

15. The method for manufacturing a monolithic ceramic electronic component according to claim 13, wherein the mother ceramic inner portion is thicker than the first mother ceramic outer layer.

16. The method for manufacturing a monolithic ceramic electronic component according to claim 13, wherein a Si content of the mother ceramic outer portion is larger than a Si content of the mother ceramic inner portion.

17. The method for manufacturing a monolithic ceramic electronic component according to claim 16, further comprising a step of forming a boundary layer between the mother ceramic inner portion and the mother ceramic outer portion, wherein Si is concentrated in the boundary layer.

* * * * *